(12) United States Patent
Maskalik et al.

(10) Patent No.: US 10,375,153 B2
(45) Date of Patent: *Aug. 6, 2019

(54) ENTERPRISE CONNECTIVITY TO THE HYBRID CLOUD

(71) Applicant: VMware, Inc., Palo Alto, CA (US)

(72) Inventors: Serge Maskalik, Los Gatos, CA (US); Weiqing Wu, Cupertino, CA (US); Debashis Basak, San Jose, CA (US); Sachin Thakkar, San Jose, CA (US); Govind Haridas, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,377

(22) Filed: Jun. 4, 2018

(65) Prior Publication Data

US 2018/0288136 A1    Oct. 4, 2018

Related U.S. Application Data

(63) Continuation of application No. 14/981,416, filed on Dec. 28, 2015, now Pat. No. 9,992,272.

(60) Provisional application No. 62/211,780, filed on Aug. 29, 2015.

(51) Int. Cl.
*H04L 29/08* (2006.01)
*H04L 12/751* (2013.01)
*H04L 12/715* (2013.01)

(52) U.S. Cl.
CPC .............. *H04L 67/10* (2013.01); *H04L 45/02* (2013.01); *H04L 45/64* (2013.01)

(58) Field of Classification Search
CPC .......... H04L 67/10; H04L 45/02; H04L 45/64
See application file for complete search history.

(56) References Cited

U.S. PATENT DOCUMENTS

| 2015/0063108 A1* | 3/2015 | Bhagavathiperumal ..................... H04L 47/12 370/235 |
| 2015/0139238 A1* | 5/2015 | Pourzandi ............... H04L 45/42 370/392 |
| 2015/0178135 A1* | 6/2015 | Wang .................... G06F 9/5027 718/104 |
| 2015/0281078 A1* | 10/2015 | Luo ..................... H04L 67/2814 709/203 |

* cited by examiner

*Primary Examiner* — Shailendra Kumar
(74) *Attorney, Agent, or Firm* — Loza & Loza, LLP

(57) ABSTRACT

A cloud computing system retrieves routing entries associated with a particular tenant of the cloud computing system and a subset of a routing table of the entire cloud computing system. The routing entries are loaded into a networking switch, which is configured to route network packets using the loaded subset of routing entries, using a general-purpose processor rather than a costly dedicated ASIC.

17 Claims, 5 Drawing Sheets

ENTERPRISE CONNECTIVITY TO THE HYBRID CLOUD

CROSS-REFERENCE TO RELATED APPLICATION(S)

This application is a continuation of U.S. patent application Ser. No. 14/981,416 (granted as U.S. Pat. No. 9,992,272), which claimed benefit of U.S. Provisional Patent Application No. 62/211,780, filed Aug. 29, 2015, which are both incorporated by reference herein.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer data centers (referred to herein as "on-premise data centers"). The public cloud can include a multi-tenant cloud architecture providing IaaS cloud services. Typically, the customer data centers are connected to the cloud data centers through a wide area network (WAN) comprising multiple service provider backbone networks. As such, there can be multiple communication paths between customer data centers and cloud data centers. Given the many communication paths, it is desirable to optimize connectivity between customer data centers and cloud data centers in a hybrid cloud system.

SUMMARY

Embodiments of the present disclosure provide a method for routing network traffic. The method includes determining traffic information between a first gateway in a first data center and a second gateway in a second data center. The first data center is managed by a first organization and the second data center is part of a cloud computing system managed by a second organization, and the first organization is a tenant in the cloud computing system. The method further includes retrieving a plurality of routing entries associated with the tenant from a routing table based on the traffic information, wherein the plurality of routing entries is a subset of the routing table, and loading the plurality of routing entries in a switch in the second data center. The method further includes receiving a network packet at the second gateway in the second data center, and forwarding, by operation of the switch, the received network packet to a destination according to at least one of the plurality of routing entries loaded in the switch, wherein the switch is configured to route network traffic using a general-purpose processor.

Another embodiment of the present disclosure includes a non-transitory computer-readable storage medium comprising instructions that, when executed in a computing device, route network traffic, by performing the steps of determining traffic information between a first gateway in a first data center and a second gateway in a second data center, wherein the first data center is managed by a first organization and the second data center is part of a cloud computing system managed by a second organization, the first organization being a tenant in the cloud computing system. The instructions further perform the steps of retrieving a plurality of routing entries associated with the tenant from a routing table based on the traffic information, wherein the plurality of routing entries is a subset of the routing table, loading the plurality of routing entries in a switch in the second data center, receiving a network packet at the second gateway in the second data center; and forwarding, by operation of the switch, the received network packet to a destination according to at least one of the plurality of routing entries loaded in the switch, wherein the switch is configured to route network traffic using a general-purpose processor.

Embodiments of the present disclosure further provide a computer system for routing network traffic. The computer system includes a system memory and a processor programmed to determine traffic information between a first gateway in a first data center and a second gateway in a second data center, wherein the first data center is managed by a first organization and the second data center is part of a cloud computing system managed by a second organization, the first organization being a tenant in the cloud computing system, retrieve a plurality of routing entries associated with the tenant from a routing table based on the traffic information, wherein the plurality of routing entries is a subset of the routing table, load the plurality of routing entries in a switch in the second data center, receive a network packet at the second gateway in the second data center, and forward, by operation of the switch, the received network packet to a destination according to at least one of the plurality of routing entries loaded in the switch, wherein the switch is configured to route network traffic using a general-purpose processor.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Internet routing tables can be very large, having many entries needed to accommodate all the Internet Protocol (IP) addresses that may be encountered. In the networking field, there are two main approaches to network hardware. One type is a "high-end" switching hardware, such as those made available by Cisco Systems, Inc. or Juniper Networks, typically has custom application-specific integrated circuits (ASICs) and very large amounts of TCAM (ternary content addressable memory) to accommodate the many routing entries. However such high-end network hardware is typically very expensive.

The other approach to networking hardware is "white-box" switches which are more affordable but have limited physical resources that might not be able to accommodate all the routing entries needed to support an Internet-facing network connectivity. As used herein, "white-box" switches and networking hardware are hardware resources which use general-purpose processors (e.g., x86-based processors) and other off-the-shelf components, such as application-specific standard products (ASSPs). Rather than have ASICs customized for routing network traffic, white-box switches include software modules configured to form a control plane to make routing decisions and perform network management, while the underlying commodity hardware functions as the data plane (forwarding plane).

Embodiments of the present disclosure effectively slice up and distribute portions of a routing table for an Internet-facing WAN gateway. Instead of using a high-end router, embodiments of the present disclosure use a software-defined approach. Traffic analysis of tenants in a cloud computing system has determined that most tenants do not send traffic everywhere throughout the Internet; most destinations are limited in set. Instead of brute-force inserting all entries within a table, embodiments of the present disclosure intelligently selects subsets of routing table entries for tenant-specific gateways.

Embodiments of the present disclosure combine input from an intelligent, route-monitoring system and input relating to what is needed in an IP flow for an application running in the cloud computing system. Embodiments of the present disclosure combine these inputs to determine a subset table of the full routing table and inserts this subset table into a white-box router.

Figure 1:
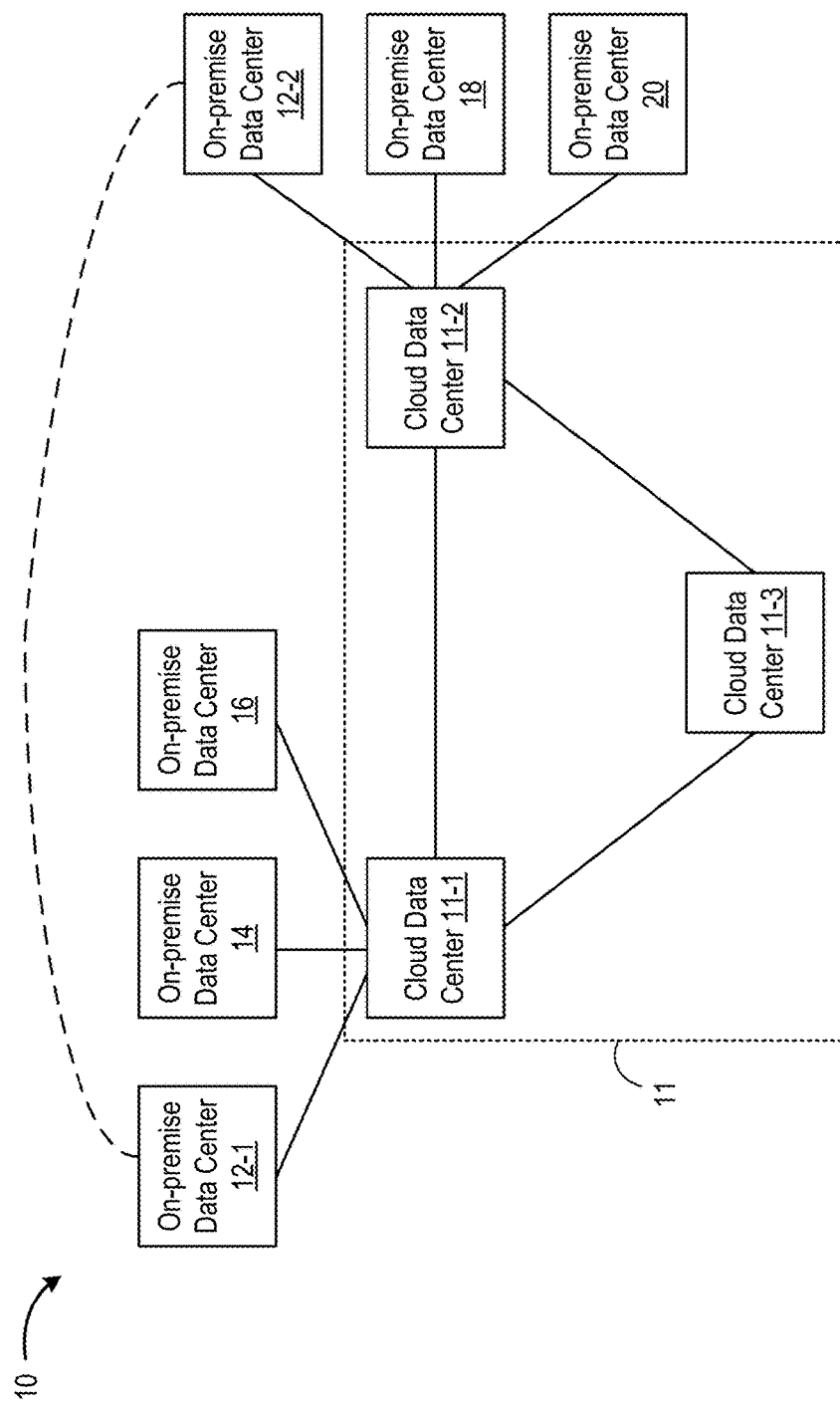
FIG. 1 is a block diagram of a hybrid cloud computing system in which one or more embodiments of the present disclosure may be utilized.

FIG. 1 is a block diagram of a hybrid cloud computing system 10 in which one or more embodiments of the present disclosure may be utilized. Hybrid cloud computing system 10 includes a plurality of virtualized computing systems implemented within on-premise data centers and a cloud computing system 11. In the example of FIG. 1, hybrid cloud computing system 10 includes on-premise data centers 12-1, 12-2, 14, 16, 18, and 20, each of which is communicatively coupled to cloud computing system 11. In the example of FIG. 1, cloud computing system 11 includes cloud data centers 11-1, 11-2, and 11-3. The number of cloud data centers and the number of on-premise data centers shown in FIG. 1 is just one example. In general, there can be any number of on-premise data centers communicatively coupled to cloud computing system 11, which can include any number of cloud data centers.

Hybrid cloud computing system 100 is configured to provide a common platform for managing and executing virtual workloads seamlessly between on-premise data centers and cloud data centers. In one embodiment, an on-premise data center may be a data center controlled and administrated by a particular enterprise or business organization, while cloud data centers of cloud computing system 11 may be operated by a cloud computing service provider and exposed as a service available to account holders, such as the particular enterprise in addition to other enterprises. As such, on-premise data center(s) of an enterprise may sometimes be referred to as a "private" cloud, and cloud computing system 11 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

In the example of FIG. 1, on-premise data centers 12-1, 14, and 16 are communicatively coupled to cloud data center 11-1, and on-premise data centers 12-2, 18, and 20 are communicatively coupled to cloud data center 11-2. A given on-premise data center can be coupled to one or more cloud data centers through one or more network connections, including direct network connections (e.g., private connections) and/or public network connections (e.g., public Internet connections). On-premise data centers 12-1 and 12-2 can be controlled and administered by the same enterprise, whereas on-premise data centers 14, 16, 18, and 20 can be controlled and administered by separate enterprises. In some embodiments, on-premise data center 12-1 can be communicatively coupled to on-premise data center 12-2 through one or more network connections. That is, a given enterprise's private cloud can include a plurality of on-premise data centers with network connectivity therebetween. Likewise, cloud data centers 11-1, 11-2, and 11-3 can include one or more network connections to support network connectivity therebetween.

In some embodiments, cloud data centers 11-1, 11-2, and 11-3 are located to support particular geographic regions. Thus, on-premise data centers 12-1, 14, and 16 can be located in one geographic region served by cloud data center 11-1. On-premise data centers 12-2, 18, and 20 can be located in another geographic region served by cloud data center 11-2. Cloud data center 11-3 can serve yet another geographic region having one or more on-premise data centers (not shown).

Figure 2:
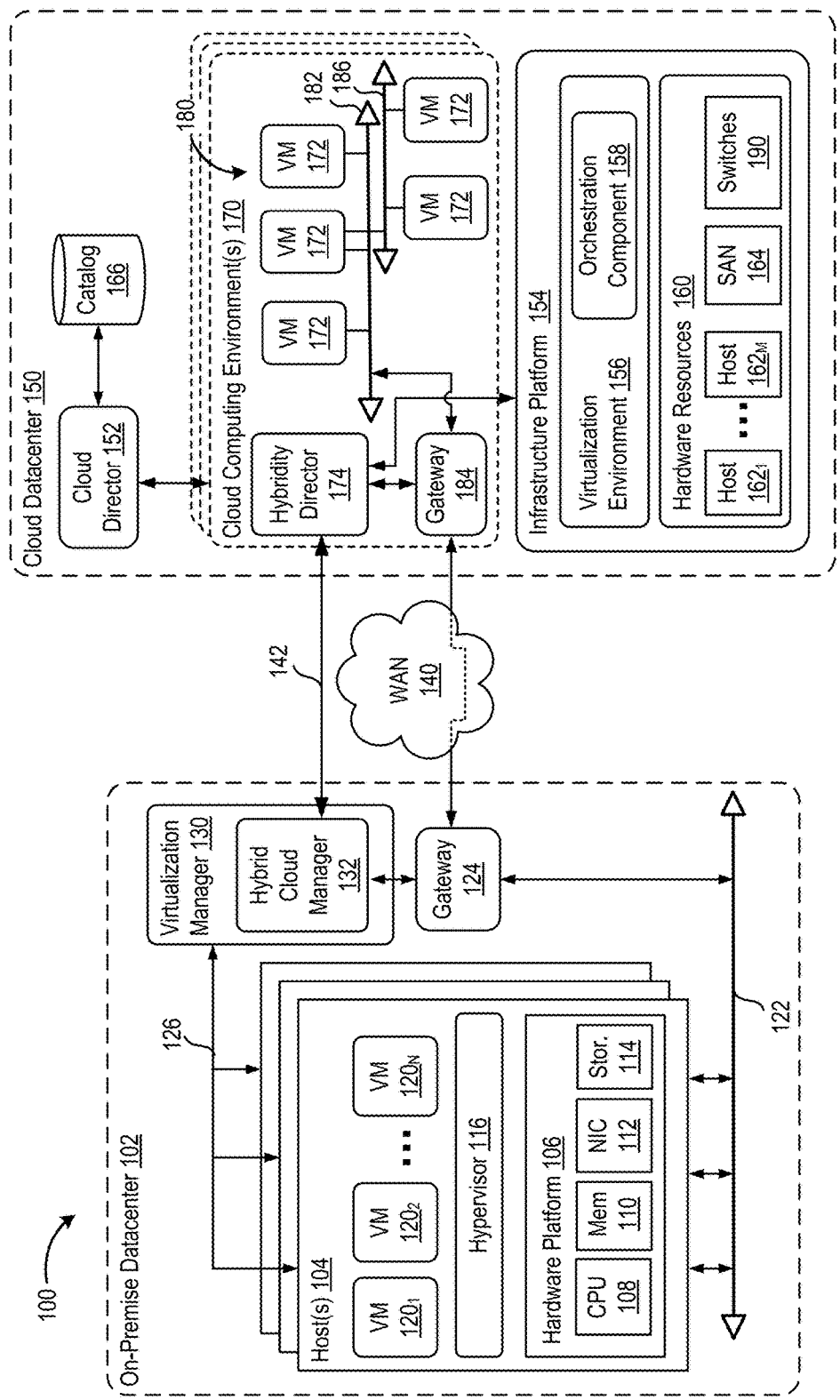
FIG. 2 is a block diagram of a portion of a hybrid cloud computing system in which one or more embodiments of the present disclosure may be utilized.

FIG. 2 is a block diagram of a hybrid cloud computing system 100 in which one or more embodiments of the present disclosure may be utilized. Hybrid cloud computing system 100 includes a virtualized computing system implementing an on-premise data center 102 and a virtualized computing system implementing a cloud data center 150. Hybrid cloud computing system 100 is a subset of hybrid cloud computing system 10 with one on-premise data center and one cloud data center. It is to be understood that each on-premise data center coupled to a cloud computing system can be configured similarly to on-premise data center 102, and each cloud data center that is part of a cloud computing system can be configured similarly to cloud data center 150. In this regard, on-premise data center 102 can be one of on-premise data centers 12-1, 12-2, 14, 16, 18, 20, and cloud data center 150 can be one of cloud data centers 11-1, 11-2, and 11-3 shown in FIG. 1.

On-premise data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs)

108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within on-premise data center 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

On-premise data center 102 includes a virtualization management component (depicted in FIG. 2 as virtualization manager 130) that may communicate to the plurality of hosts 104 via a network, sometimes referred to as a management network 126. In one embodiment, virtualization manager 130 is a computer program that resides and executes in a central server, which may reside in on-premise data center 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative tasks. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in on-premise data center 102 with connectivity to an external wide area network (WAN) 140 (e.g., the public Internet). Gateway 124 may manage external public IP addresses for VMs 120 and route traffic incoming to and outgoing from on-premise data center 102 and provide networking services, such as firewalls, network address translation (NAT), dynamic host configuration protocol (DHCP), load balancing, and virtual private network (VPN) connectivity over WAN 140. As described further herein, gateway 124 can optimize connectivity between on-premise data center 102 and cloud data center 150 through WAN 140.

In one or more embodiments, cloud data center 150 is configured to dynamically provide an enterprise (or users of an enterprise) with one or more virtual data centers 180 in which a user may provision VMs 120, deploy multi-tier applications on VMs 120, and/or execute workloads. Cloud data center 150 includes an infrastructure platform 154 upon which a cloud computing environment 170 may be executed. In the particular embodiment of FIG. 2, infrastructure platform 154 includes hardware resources 160 having computing resources (e.g., hosts $162_1$ to $162_N$), storage resources (e.g., one or more storage array systems, such as SAN 164), and networking resources (e.g., switches 190), which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing on-premise data center 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 2, cloud data center 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to on-premise data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud data center 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 2, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to WAN 140 (e.g., the public Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over WAN 140 with another VPN endpoint, such as gateway 124 within on-premise data center 102. In other embodiments, gateway 184 may be configured to connect to communicate with on-premise data center 102 using a high-throughput, dedicated link (depicted as a direct connect 142) between on-premise data center 102 and cloud computing system 150. In one or more embodiments, gateways 124 and 184 are configured to provide a "stretched" layer-2 (L2) network that spans on-premise data center 102 and virtual data center 180, as shown in FIG. 2.

While FIG. 2 depicts communication between on-premise gateway 124 and cloud-side gateway 184 for illustration purposes, it should be recognized that communication between multiple on-premise gateways 124 and cloud-side gateways 184 may be used. Furthermore, while FIG. 2 depicts a single instance of a gateway 184, it is recognized that gateway 184 may represent multiple gateway components within cloud data center 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud data center 150 may be used to manage all public-facing traffic incoming and outgoing from cloud data center 150.

In one embodiment, each virtual data center 180 includes a "hybridity" director module (depicted as hybridity director 174) configured to communicate with the corresponding hybrid cloud manager 132 in on-premise data center 102 to enable a common virtualized computing platform between on-premise data center 102 and cloud data center 150. Hybridity director 174 (e.g., executing as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud data center 150 via infrastructure platform 154.

Figure 3:
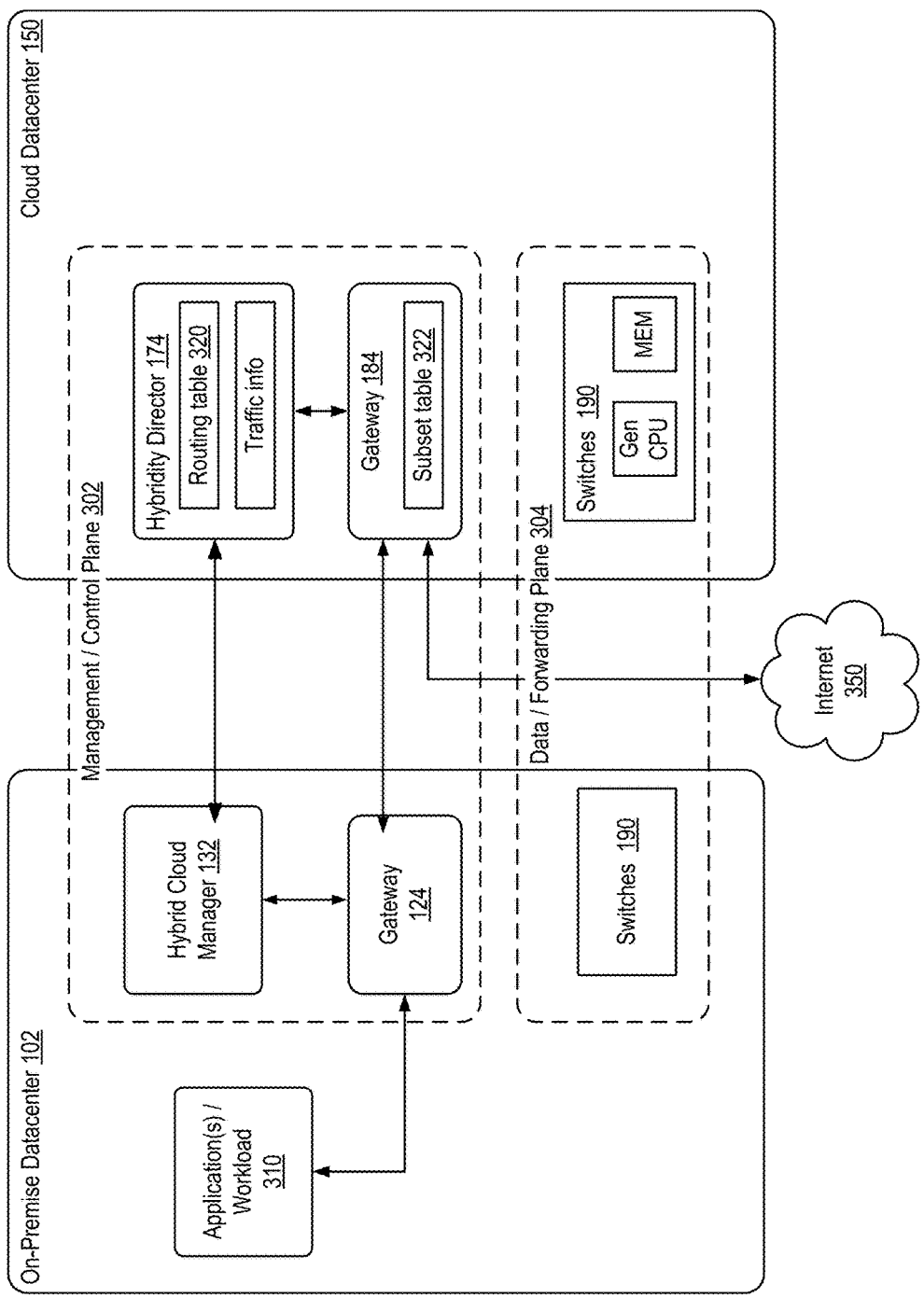
FIG. 3 is a block diagram depicting a logical view of hybrid cloud computing system of FIG. 2 according to embodiments.

FIG. 3 is a block diagram depicting a logical view of hybrid cloud computing system 100 according to embodiments. In one or more embodiments, the networking layer of hybrid cloud computing system 100 includes a management and control plane 302 comprised of hybrid cloud manager 132, hybridity director 174, and gateways 124, 184 in cloud data center 150, as described above. In some embodiments, hybrid cloud manager 132 and hybridity director 174 form a management plane and gateways 124, 184 form a separate control plane. In other embodiments, the planes are combined. Components within management and control plane 302 are configured to coordinate to exchange information regarding the network addresses and traffic information of gateways 124, 184 as well as information related to applications 310 and other workloads executing within the hybrid cloud computing system. In some embodiments, hybridity director 174 retrieves tenant workload information from cloud director 152 or other components.

Various applications 310 execute within on-premise data center 102 and are configured for communication with on-premise gateway 124 to obtain access to a WAN. Applications 310 can include any software application, workload, process, thread, or the like executing on a computer (e.g., virtual or physical) within on-premise data center 102. Likewise, various applications execute within cloud data center 150 and are configured for communication with cloud gateway 184 to obtain access to WAN 140. Applications can include any software application, process, thread, or the like executing on a computer (e.g., virtual or physical) within cloud data center 150

Some applications 310 in on-premise data center 102 can cooperate with other applications (not shown) in cloud data center 150. For example, a VM migration process executing within on-premise data center 102 can cooperate with a VM migration process executing within cloud data center 150 to migrate a VM from on-premise data center 102 to cloud data center 150 over WAN 140. VM migration is merely one example of a myriad of applications designed to cooperate through communication over WAN 140. To initiate communication, an application 310 can communicate with on-premise gateway 124 to establish a connection through WAN 140 between on-premise gateway 124 and cloud gateway 184. Alternatively, an application in cloud data center 150 can communicate with cloud gateway 184 to establish a connection through WAN 140 between on-premise gateway 124 and cloud gateway 184.

Hybrid cloud computing system 100 further includes a data plane 304 (also referred to as a forwarding plane) comprised of one or more hardware switches 190. In one alternative embodiment, gateways 124, 184 are configured as part of data plane 304 instead of the management and control plane 302. In some embodiments, switch 190 is a so-called "white-box" switch, which has one or more general-purpose processors (e.g., x86-based processors) and other off-the-shelf components, such as application-specific standard products (ASSPs). Rather than have ASICs customized for routing network traffic, switch 190 is configured to communicate with virtual appliances that form management and control plane 302 to make routing decisions and perform network management, while the underlying commodity hardware of switch 190 functions as the data plane (forwarding plane). In some embodiments, gateways 124, 184 execute as virtual appliances on switch 190; in other embodiments, gateways 124, 184 are executing on separate hosts 162 in cloud data center 150.

As depicted in FIG. 3, hybridity director 174 (or other component within management and control plane 302) maintains a full routing table 320 containing all routing entries learned for Internet-facing traffic to Internet 350 as well as destinations among on-premise data center 102 and cloud data center 150. As described in greater detail below, hybridity director 174 is configured to retrieve a plurality of routing entries from routing table 320 to form a subset table 322, which is then loaded into gateways 184. In some embodiments, the subset table 322 is routed into memory of a white-box switch 190.

In some embodiments, gateway 184 communicates with many other routers on the Internet, retrieves all the routing information (which is then relayed up to hybridity director 174), performs a global layout calculation, distribute this information out to each data node (switch 190s). In some embodiments, gateways 124 are injected with data having all possible cloud destination.

Figure 4:
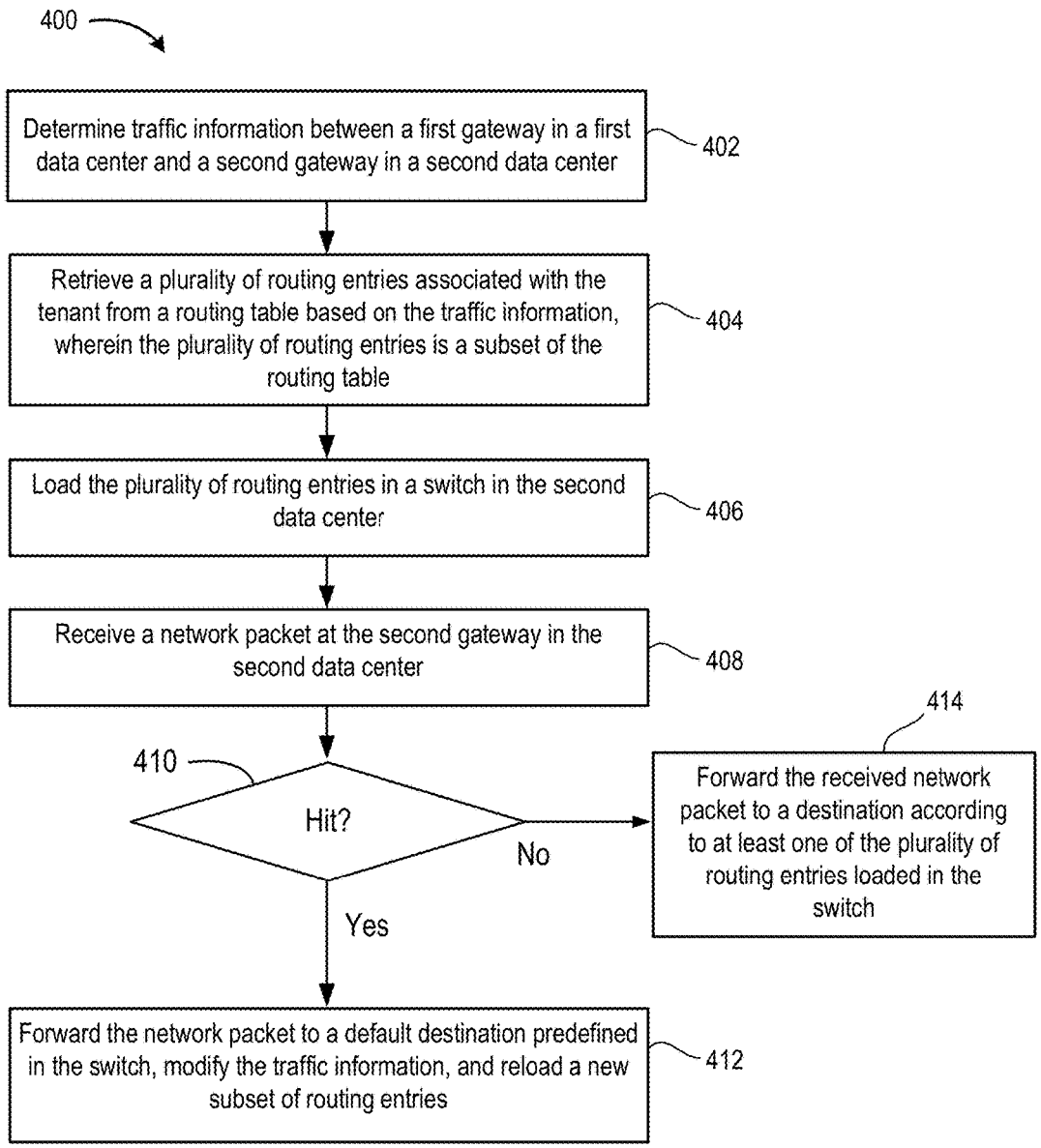
FIG. 4 is a flow diagram depicting a method of routing network traffic of a hybrid cloud computing system according to embodiments.

FIG. 4 is a flow diagram depicting a method 400 of routing network traffic, according to embodiments of the present disclosure. Method 400 begins at step 402, where hybridity director 174 determines traffic information between a first gateway in a first data center and a second gateway in a second data center. The first data center is managed by a first organization and the second data center is part of a cloud computing system managed by a second organization, the first organization being a tenant in the cloud computing system. In some embodiments, second gateway 184 is a virtual appliance executing on switch 190. In some embodiments, switch 190 comprises a forwarding plane 304 of the second data center.

In some embodiments, hybridity director 174 receives information specifying a workload associated with the tenant and to be executed between the first data center and the second data center. In some embodiments, hybrid cloud manager 132 relays traffic information (received from hybridity director 174) related to destinations in the cloud computing system into the first gateway 124 in the first data center 102.

At step 404, hybridity director 174 retrieves a plurality of routing entries associated with the tenant from a routing table based on the traffic information. The plurality of routing entries is a subset of the routing table 320. In some embodiments, hybridity director 174 loads only those routing entries which have determined to be useful to the particular tenant associated with the target gateway 184. In some embodiments, the retrieve routing entries are those entries that have been used or relied upon in the past to route traffic for gateway 184 associated with that tenant. In this way, hybridity director 174 is able to manage traffic for a given tenant without loading the entire routing table, which may include routing entries that are not relevant to that particular tenant.

At step 406, hybridity director 174 loads the plurality of routing entries in a switch in the second data center. In embodiments where hybridity director 174 uses information specifying a workload associated with the tenant, hybridity director 174 retrieves the plurality of routing entries in the routing table needed to execute the workload.

At step 408, gateway 184 receives a network packet at the second gateway in the second data center. At step 410, gateway 184 checks whether the destination and other routing information contained in the network packet can be resolved using the subset table 322 loaded in gateway 184. If so, at step 412, switch 190 forward the received network packet to a destination according to at least one of the plurality of routing entries loaded in switch 190. In some embodiments, switch 190 is configured to route network traffic using a general-purpose processor, rather than a custom ASIC and TCAM.

Otherwise, at step 414, responsive to determining that the destination of the network packet is not found in the plurality of entries loaded in the switch, switch 190 forwards the network packet to a default destination predefined in the switch, and relays the miss to hybridity director 174. In some embodiments, hybridity director 174 modifies the traffic information to indicate that the received network packet was a miss, and retrieves a second plurality of routing entries from the routing table 322 based on the modified traffic information. The updated, second plurality of routing entries is loaded into switch 190, i.e., the second plurality of routing entries replaces existing routing entries loaded in the switch.

Figure 5:
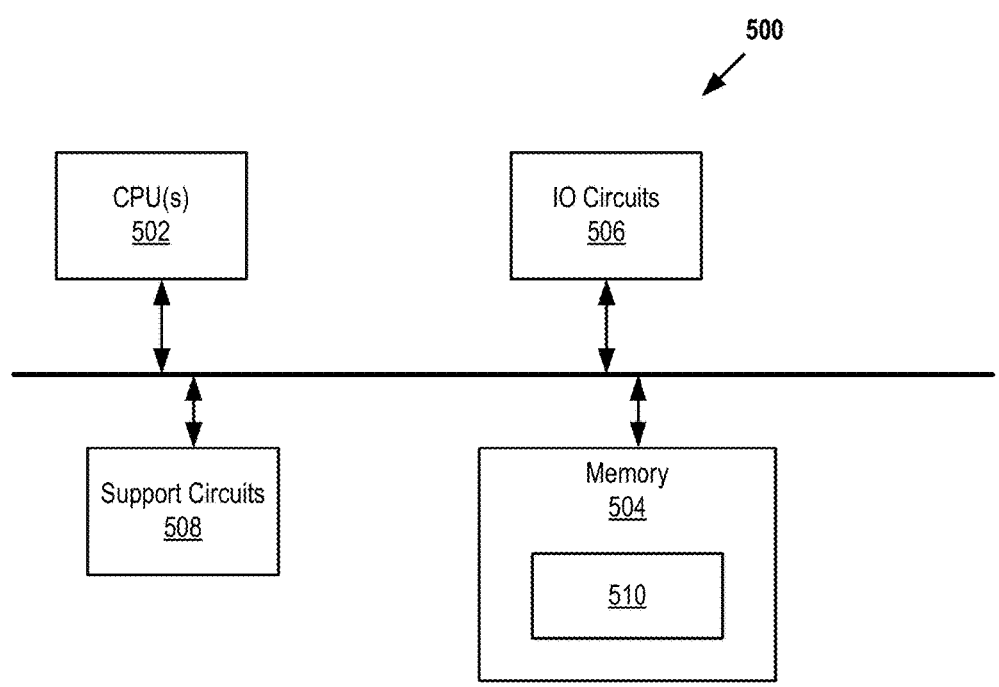
FIG. 5 is a block diagram depicting an example of a computer system in which one or more embodiments of the present disclosure may be utilized.

FIG. 5 is a block diagram depicting an example of a computer system 500 in which one or more embodiments of the present disclosure may be utilized. Computer system 500 can be used as a host to implement on-premise gateway 124, cloud gateway 184, or other gateway in a hybrid cloud computing system. In other embodiments, computer system 500 is a "white-box" switch executing a cloud gateway 184 (or other gateway) as a virtual appliance. Computer system 500 includes one or more central processing units (CPUs) 502, memory 504, input/output (IO) circuits 506, and various support circuits 508. Each of CPUs 502 can include any general-purpose microprocessor known in the art (and not a custom ASIC customized for routing network traffic) and can execute instructions stored on computer readable storage, such as memory 504. Memory 504 can include various volatile and/or non-volatile memory devices, such as random access memory (RAM), read only memory (ROM), and the like. Instructions and data 510 for performing the various methods and techniques described above can be stored in memory 504 for execution by CPUs 502. That is, memory 504 can store instructions executable by CPUs 502 to perform one or more steps/sub-steps described above in FIGS. 4 and 6. Support circuits 508 include various circuits used to support operation of a computer system as known in the art.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for routing network traffic, the method comprising:
   determining traffic information between a first gateway in a first data center and a second gateway in a second data center, including receiving information specifying a workload to be executed between the first data center and the second data center;
   retrieving a subset of routing entries of a routing table associated with the first data center based on the traffic information;
   loading the subset of the routing entries of the routing table in a switch in the second data center;
   receiving a network packet at the second gateway in the second data center; and
   forwarding, by operation of the switch, the received network packet to a destination according to at least one routing entry from the subset of the routing entries of the routing table loaded in the switch.

2. The method of claim 1, wherein retrieving the subset of routing entries associated with the first data center based on the traffic information further comprises:
   retrieving the subset of routing entries in the routing table needed to execute the workload.

3. The method of claim 1, further comprising:
   loading traffic information related to destinations in a cloud computing system that includes the second data center into the first gateway in the first data center.

4. The method of claim 1, further comprising:
   responsive to determining that the destination of the network packet is not found in the subset of the routing entries of the routing table loaded in the switch, forwarding the network packet to a default destination predefined in the switch;
   modifying the traffic information to indicate that the received network packet was a miss;
   retrieving a second subset of the routing entries of the routing table based on the modified traffic information; and
   loading the second subset of the routing entries of the routing table into the switch, wherein the second subset of routing entries replaces existing routing entries loaded in the switch.

5. The method of claim 1, wherein the second gateway comprises a virtual appliance executing on the switch.

6. The method of claim 1, wherein the switch comprises a forwarding plane of the second data center.

7. A non-transitory computer-readable storage medium comprising instructions that, when executed in a computing device, route network traffic, by performing the steps of:
   determining traffic information between a first gateway in a first data center and a second gateway in a second data center, including receiving information specifying a workload to be executed between the first data center and the second data center;
   retrieving a subset of routing entries of a routing table associated with the first data center based on the traffic information;
   loading the subset of the routing entries of the routing table in a switch in the second data center;
   receiving a network packet at the second gateway in the second data center; and
   forwarding, by operation of the switch, the received network packet to a destination according to at least one routing entry from the subset of the routing entries of the routing table loaded in the switch.

8. The non-transitory computer-readable storage medium of claim 7, wherein instructions for retrieving the subset of routing entries associated with the first data center based on the traffic information further comprises instructions for:
   retrieving the subset of routing entries in the routing table needed to execute the workload.

9. The non-transitory computer-readable storage medium of claim 7, further comprising instructions for:
   loading traffic information related to destinations in a cloud computing system that includes the second data center into the first gateway in the first data center.

10. The non-transitory computer-readable storage medium of claim 7, further comprising instructions for:
    responsive to determining that the destination of the network packet is not found in the subset of the routing entries of the routing table loaded in the switch, forwarding the network packet to a default destination predefined in the switch;
    modifying the traffic information to indicate that the received network packet was a miss;
    retrieving a second subset of the routing entries of the routing table based on the modified traffic information; and
    loading the second subset of the routing entries of the routing table into the switch, wherein the second subset of routing entries replaces existing routing entries loaded in the switch.

11. The non-transitory computer-readable storage medium of claim 7, wherein the second gateway comprises a virtual appliance executing on the switch.

12. The non-transitory computer-readable storage medium of claim 7, wherein the switch comprises a forwarding plane of the second data center.

13. A computer system for routing network traffic, the computer system comprising a system memory and a processor programmed to:
    determine traffic information between a first gateway in a first data center and a second gateway in a second data center, and receive information specifying a workload to be executed between the first data center and the second data center;
    retrieve a subset of routing entries of a routing table associated with the first data center based on the traffic information;
    load the subset of the routing entries of the routing table in a switch in the second data center;
    receive a network packet at the second gateway in the second data center; and
    forward, by operation of the switch, the received network packet to a destination according to at least one routing entry from the subset of the routing entries of the routing table loaded in the switch.

14. The computer system of claim 13, wherein the processor programmed to retrieve the subset of routing entries associated with the first data center based on the traffic information is further programmed to:
    retrieve the subset of routing entries in the routing table needed to execute the workload.

15. The computer system of claim 13, wherein the processor is further programmed to:
    load traffic information related to destinations in a cloud computing system that includes the second data center into the first gateway in the first data center.

16. The computer system of claim 13, wherein the processor is further programmed to:

responsive to determining that the destination of the network packet is not found in the subset of the routing entries of the routing table loaded in the switch, forward the network packet to a default destination predefined in the switch;

modify the traffic information to indicate that the received network packet was a miss;

retrieve a second subset of the routing entries of the routing table based on the modified traffic information; and load the second subset of the routing entries of the routing table into the switch, wherein the second subset of routing entries replaces existing routing entries loaded in the switch.

17. The computer system of claim 13, wherein the second gateway comprises a virtual appliance executing on the switch, and wherein the switch comprises a forwarding plane of the second data center.

* * * * *